United States Patent
Ji et al.

(10) Patent No.: US 11,762,509 B2
(45) Date of Patent: Sep. 19, 2023

(54) ULTRASONIC PATTERN RECOGNITION ASSEMBLIES, PREPARATION METHODS THEREOF AND DISPLAY DEVICES

(71) Applicant: BOE Technology Group Co., Ltd., Beijing (CN)

(72) Inventors: Yaqian Ji, Beijing (CN); Yuzhen Guo, Beijing (CN); Yingming Liu, Beijing (CN); Yanling Han, Beijing (CN); Chenyang Zhang, Beijing (CN); Xiufeng Li, Beijing (CN); Peixiao Li, Beijing (CN); Yue Gou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/764,848

(22) PCT Filed: Apr. 14, 2021

(86) PCT No.: PCT/CN2021/087140
§ 371 (c)(1),
(2) Date: Mar. 29, 2022

(87) PCT Pub. No.: WO2021/227750
PCT Pub. Date: Nov. 18, 2021

(65) Prior Publication Data
US 2022/0326793 A1    Oct. 13, 2022

(30) Foreign Application Priority Data

May 15, 2020    (CN) .......................... 202010412521.3

(51) Int. Cl.
*G06F 3/043*    (2006.01)
*G06V 40/13*    (2022.01)
*G06F 3/041*    (2006.01)

(52) U.S. Cl.
CPC ............ *G06F 3/043* (2013.01); *G06F 3/0412* (2013.01); *G06V 40/1306* (2022.01); *G06F 2203/04103* (2013.01)

(58) Field of Classification Search
None
See application file for complete search history.

(56) References Cited

U.S. PATENT DOCUMENTS

2017/0090649 A1    3/2017   Lee
2020/0353507 A1*   11/2020  Zhao .................. G06V 40/1306
(Continued)

FOREIGN PATENT DOCUMENTS

CN    109829419 A    5/2019
CN    111133441 A    5/2020
(Continued)

OTHER PUBLICATIONS

PCT/CN2021/087140 international search report dated Jun. 30, 2021.

*Primary Examiner* — Nicholas J Lee
(74) *Attorney, Agent, or Firm* — IPRO, PLLC

(57) ABSTRACT

An ultrasonic pattern recognition assembly comprising: a substrate; a receiving member comprising at least one receiving electrode disposed on the substrate; a piezoelectric layer disposed on the substrate and covering the receiving member; a seed member comprising at least one seed block disposed on at least a portion of the piezoelectric layer; an insulating member disposed on the seed member and having at least one exposed portion, the at least one exposed portion exposing a portion of a surface of the seed member; and a transmitting member comprising at least one transmitting electrode disposed on the seed member, the at least one transmitting electrode extending from a surface of the seed member exposed by the exposed portion in a direction away (Continued)

from the substrate. A display device and a method of fabricating an ultrasonic pattern recognition assembly are also disclosed.

18 Claims, 7 Drawing Sheets

(56) References Cited

U.S. PATENT DOCUMENTS

2021/0019018 A1* 1/2021 Guo ................... G06V 40/1306
2021/0209334 A1 7/2021 Liu et al.

FOREIGN PATENT DOCUMENTS

| CN | 111597989 A | 8/2020 |
| KR | 20170104314 A | 9/2017 |
| WO | 2021092851 A1 | 5/2021 |

* cited by examiner

ULTRASONIC PATTERN RECOGNITION ASSEMBLIES, PREPARATION METHODS THEREOF AND DISPLAY DEVICES

The present disclosure is the U.S. national phase of PCT Application No. PCT/CN2021/087140 filed on Apr. 14, 2021, which claims the benefit of Chinese Patent Application No. 202010412521.3, entitled "Ultrasonic Pattern Recognition Assembly, Preparation Method Thereof, and Display Device," filed with the Chinese Patent Office on May 15, 2020, the entire contents of which are incorporated herein by reference.

TECHNICAL FIELD

Embodiments of the present disclosure relate to ultrasonic pattern recognition assemblies, preparation methods thereof, and display devices.

BACKGROUND

With the development of science and technology, applications of fingerprint recognition technology have become wider and wider. The ultrasonic fingerprint recognition technology has a high recognition accuracy and can be used for under-screen fingerprint recognition.

Ultrasonic fingerprint recognition modules generally include transmitting electrodes, receiving electrodes, and a piezoelectric material layer therebetween. The transmitting electrodes may include a plurality of transmitting electrodes arranged at intervals, and they are typically prepared by using an electroplating process, during the period of which the transmitting electrodes are generated in a direction parallel to a substrate while growing in a direction perpendicular to the substrate. To avoid the situation where a short circuit occurs between adjacent transmitting electrodes in contact with each other, a sufficiently large gap needs to be kept between the two transmitting electrodes such that the transmitting electrode has a small area in contact with the piezoelectric layer, resulting in a reduction in the energy of the transmitted ultrasonic wave.

SUMMARY

At least some embodiments of the present disclosure provide an ultrasonic pattern recognition assembly comprising: a substrate; A receiving member comprising at least one receiving electrode disposed on the substrate; a piezoelectric layer disposed on the substrate and covering the receiving member; a seed member comprising at least one seed block disposed on at least a portion of the piezoelectric layer; an insulating member disposed on the seed member and having at least one exposed portion, the at least one exposed portion exposing a portion of a surface of the seed member; and a transmitting member comprising at least one transmitting electrode disposed on the seed member, the at least one transmitting electrode extending from a surface of the seed member exposed by the exposed portion in a direction away from the substrate.

In some embodiments of the present disclosure, the at least one seed block is arranged in an array, for each of the at least one seed block, the at least one exposed portion is arranged in an array, the at least one exposed portion exposes portions of a surface of the seed block, and one of the at least one transmitting electrode is provided on each of the exposed portions of the surface of the seed block.

In some embodiments of the present disclosure, a dimension of a portion of the insulating member located between adjacent two of the transmitting electrodes satisfies the relationship:

$$d > 2 * \frac{b}{a} x;$$

where d denotes a dimension of the portion of the insulating member located between the adjacent two of the transmitting electrodes in a direction parallel to the substrate;

$$\frac{b}{a}$$

denotes a ratio of a growth rate of the transmitting electrode in a direction parallel to the substrate to a growth rate in a direction perpendicular to the substrate; and x denotes a dimension of the transmitting electrode in a direction perpendicular to the substrate.

In some embodiments of the present disclosure, a thickness of the insulating member ranges from 0.1 μm to 1 μm.

In some embodiments of the present disclosure, a material of the insulating member comprises at least one of silicon oxide, silicon nitride, and resin.

In some embodiments of the present disclosure, the at least one transmitting electrode is formed by an electroplating process.

In some embodiments of the present disclosure, a material of the at least one seed block comprises at least one of molybdenum, copper, titanium, and aluminum.

In some embodiments of the present disclosure, a number of the at least one receiving electrode is equal to a number of the at least one transmitting electrode, and the at least one receiving electrode and the at least one transmitting electrode are substantially aligned in a direction perpendicular to the substrate.

In some embodiments of the present disclosure, the at least one receiving electrode and the at least one transmitting electrode are interleaved.

In some embodiments of the present disclosure, the substrate is a flexible substrate or a rigid substrate.

In some embodiments of the present disclosure, a dimension of the at least one transmitting electrode in a direction perpendicular to the substrate is 20 μm.

At least some embodiments of the present disclosure provide a display device comprising a display module; and the ultrasonic pattern recognition assembly described as above.

In some embodiments of the present disclosure, a distance of the at least one transmitting electrode to the display module is less than a distance of the at least one receiving electrode to the display module; or, the distance of the at least one transmitting electrode to the display module is greater than the distance of the at least one receiving electrode to the display module.

At least some embodiments of the present disclosure provide a method of fabricating an ultrasonic pattern recognition assembly, comprising: providing a substrate; forming at least one receiving electrode on the substrate; forming a piezoelectric layer on the substrate, the piezoelectric layer covering the at least one receiving electrode; forming at least one seed block on the piezoelectric layer, the at least one seed block being arranged in an array; forming an insulating member on a side of the at least one seed member away from the substrate, the insulating member being provided with at least one exposed portion, the at least one exposed portion exposing a portion of a surface of the at least one seed block; and forming at least one transmitting electrode on the exposed surface of the at least one seed block by using an electroplating process, the at least one transmitting electrode extending from the exposed surface of the at least one seed block in a direction away from the substrate.

In some embodiments of the present disclosure, a dimension of a portion of the insulating member located between adjacent two of the transmitting electrodes satisfies the relationship:

$$d > 2 * \frac{b}{a} x;$$

where d denotes a dimension of the portion of the insulating member located between the adjacent two of the transmitting electrodes in a direction parallel to the substrate;

$$\frac{b}{a}$$

denotes a ratio of a growth rate of the transmitting electrode in a direction parallel to the substrate to a growth rate in a direction perpendicular to the substrate; and x denotes a dimension of the transmitting electrode in a direction perpendicular to the substrate.

In some embodiments of the present disclosure, a thickness of the insulating member ranges from 0.1 μm to 1 μm.

In some embodiments of the present disclosure, a material of the insulating member comprises at least one of silicon oxide, silicon nitride, and a resin.

In some embodiments of the present disclosure, a material of the at least one seed block comprises at least one of molybdenum, copper, titanium, and aluminum.

In some embodiments of the present disclosure, a material of the at least one transmitting electrode comprises at least one of copper, molybdenum, and titanium.

DETAILED DESCRIPTION OF THE EMBODIMENTS

Figure 1:
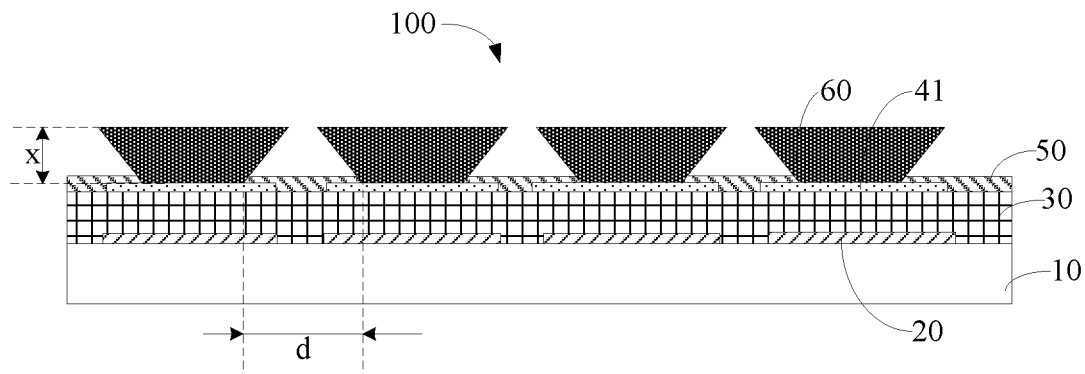
FIG. 1 is a partial cross-sectional view of an ultrasonic pattern recognition assembly in accordance with an exemplary embodiment of the present disclosure.
Figure 2:
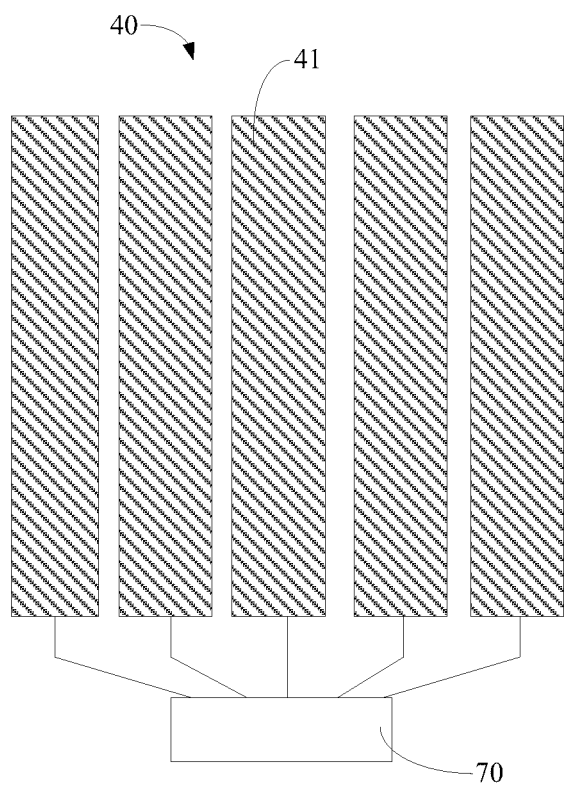
FIG. 2 is a partial schematic view of a seed member of the ultrasonic pattern recognition assembly shown in FIG. 1.

Reference will now be made in detail to exemplary embodiments, examples of which are illustrated in the accompanying drawings. When the following description refers to the drawings, the same numbers in different drawings represent the same or similar elements unless otherwise indicated. The embodiments described in the following exemplary embodiments do not represent all embodiments consistent with the present disclosure. Rather, they are merely examples of apparatus and methods consistent with some aspects of the disclosure, as detailed in the following claims.

The terminology used herein is for the purpose of describing particular embodiments only and is not intended to be limiting of the disclosure. As used in this disclosure and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

It will be understood that, although the terms first, second, third, etc. may be used herein to describe various information, they should not be limited by these terms. These terms are only used to distinguish one type of information from each other. For example, first information could also be termed as second information, and, similarly, second information could also be termed as first information, without departing from the scope of the present disclosure. The word "if" as used herein may be construed as "at" or "when" or "in response to determining" depending on the context.

An ultrasonic pattern recognition assembly includes a transmitting electrode member, a receiving electrode member, and a piezoelectric layer therebetween, in which the transmitting electrode member is configured to have a relatively large thickness so that the ultrasonic pattern recognition assembly may have a certain resonant frequency. When a metal electrode has a relatively large thickness, a time period for etching is relatively long and efficiency thereof is relatively low if the etching is performed by using a photolithography process. In technologies known to the inventors, transmitting electrodes are generally prepared by using an electroplating process. When the transmitting electrodes are formed by using the electroplating process, the transmitting electrodes are grown simultaneously both in a direction parallel to the substrate and in a direction perpendicular to the substrate. A relatively large gap is reserved between the neighboring transmitting electrodes at a side near the piezoelectric layer to avoid the neighboring transmitting electrodes from contacting, resulting in a small area of the transmitting electrodes near the surface of the piezoelectric layer, thereby resulting in a reduced driving ability of the transmitting electrodes to the piezoelectric layer.

An ultrasonic pattern recognition assembly and a manufacturing method thereof and a display device according to the embodiments of the present disclosure will be described in detail below with reference to the accompanying drawings. The features in the embodiments described below may be supplemented or combined with each other in case of no conflict.

At least one embodiment of the present disclosure provides an ultrasonic pattern recognition assembly. The ultrasonic pattern recognition assembly includes: a substrate; a receiving member including at least one receiving electrode disposed on the substrate; a piezoelectric layer disposed on the substrate and covering the receiving member; a seed member including at least one seed block disposed on at least a portion of the piezoelectric layer; an insulating member disposed on the seed member and having at least one exposed portion that exposes a portion of a surface of the seed member; and a transmitting member including at least one transmitting electrode disposed on the seed member, where the at least one transmitting electrode extends from a surface of the seed member exposed by the at least one exposed portion in a direction away from the substrate.

Referring to FIGS. 1 to 12, the ultrasonic pattern recognition assembly 100 includes a substrate 10, a receiving member, a piezoelectric layer 30, a seed member 40, an insulating member 50, and a transmitting member.

The receiving member, the piezoelectric layer 30, the seed member 40, the insulating member 50 and the transmitting member are located on the substrate 10. The receiving member includes at least one receiving electrode 20 disposed on the substrate. The piezoelectric layer 30 is disposed on the substrate 10 and covers the receiving member. The seed member 40 includes at least one seed block disposed on at least a portion of the piezoelectric layer 30. The insulating member 50 is disposed on the seed member 40 and has at least one exposed portion 51 exposing a portion of the surface of the seed member 40. The transmitting member includes at least one transmitting electrode 60 disposed on the seed member 40, the at least one transmitting electrode 60 extending from an exposed surface of the seed member 40 in a direction away from the seed member 40.

In the ultrasonic pattern recognition assembly 100 according to embodiments of the present disclosure, the at least one exposed portion of the insulating member 50 exposes a portion of the surface of the seed member 40, and the at least one transmitting electrode 60 extends from the exposed surface of the seed member 40 in a direction away from the substrate 10, such that an area of a surface of each seed member 40 parallel to the piezoelectric layer 30 is larger than an area of a contact surface of the at least one transmitting electrode 60 with the seed member 40. Meanwhile, in the ultrasonic pattern recognition assembly 100 according to embodiments of the present disclosure, the at least one transmitting electrode 60 can drive the piezoelectric layer 30 through the seed member 40, and thus the driving ability of the at least one transmitting electrode 60 to the piezoelectric layer 30 can be prevented from being decreased with ensuring adjacent transmitting electrodes being not in contact, and the accuracy of pattern recognition can be improved.

In operation of the ultrasonic pattern recognition assembly, a driving voltage is applied to the at least one transmitting electrode, the receiving member is grounded, and the piezoelectric layer 30 generates ultrasonic waves under excitation of the driving voltage. In embodiments of the present disclosure, the driving voltage can be applied to the at least one transmitting electrode through the seed member 40. The ultrasonic wave generated by the piezoelectric layer 30 propagates to a pattern to be identified and is reflected by the pattern. The reflected ultrasonic wave propagates to the piezoelectric layer 30 which converts the reflected ultrasonic wave into electrical signals. The receiving member outputs the electrical signals to a chip, and the chip generates a pattern image according to the received electrical signals and performs pattern recognition. The pattern includes fingerprint, palm print, toe print, and the like.

The ultrasonic pattern recognition assembly may include a functional region and a bonding region, where the substrate 10, the receiving member, the piezoelectric layer 30, the seed member 40, the insulating member 50 and the transmitting member may be located in the functional region, and the bonding region may be provided with traces each having one end for electrically connecting with the seed member and the transmitting member and another end for connecting to the chip.

In an embodiment of the present disclosure, the substrate 10 may be a flexible substrate or a rigid substrate. The flexible substrate may be made of one or more of PET (polyethylene terephthalate), PI (polyimide) and PC (polycarbonate). The material of the rigid substrate may be glass, metal, or the like.

In one embodiment of the present disclosure, the receiving member may include a plurality of receiving electrodes 20 arranged at intervals. An orthographic projection of each receiving electrode 20 on the substrate 10 at least partially overlaps with an orthographic projection of the seed member 40 on the substrate 10, so that an electric field may be generated, and thus ultrasonic waves may be generated by the piezoelectric layer, when a voltage is applied to the seed member and the receiving electrodes.

The ultrasonic pattern recognition assembly may further include a bonding region, which is provided with a plurality of traces, located at an edge. Each of the receiving electrodes 20 is connected to the chip by a respective trace in the bonding region. The chip may apply a voltage to the receiving electrodes 20 or may receive electrical signals output by the receiving electrodes 20 via the traces. A number of the receiving electrodes 20 may be identical to that of the transmitting electrodes 60, and the plurality of receiving electrodes 20 respectively receive electrical signals converted from the ultrasound waves reflected by different positions of the pattern to be identified and output the electrical signals.

In an embodiment of the present disclosure, an orthographic projection of the piezoelectric layer 30 on the substrate 10 covers the entire area of the substrate 10. The piezoelectric layer is made of a piezoelectric material and may not only convert ultrasonic waves into electrical signals, but also convert electrical signals into ultrasonic waves under an electric field.

In an embodiment of the present disclosure, the material of the seed member 40 may be a metal with relatively good conductivity, such as molybdenum, copper, titanium, aluminum, or the like.

In an embodiment of the present disclosure, a thickness of the insulating member 50 ranges from 0.1 µm to 1 µm. As such, it can be avoided that the process cannot be achieved easily due to a too small thickness of the insulating member 50, and that the growth of the at least one transmitting electrode 60 may be affected due to a too large thickness of the insulating member. The thickness of the insulating member 50 may be, for example, 0.1 µm, 0.3 µm, 0.5 µm, 0.8 µm, 1 µm, or the like.

In an embodiment of the present disclosure, the material of the insulating member 50 includes at least one of silicon oxide, silicon nitride, and resin. The Young's modulus of the materials such as silicon oxide, silicon nitride and resin is relatively large, so that the amount of attenuation of the ultrasound waves reflected by the pattern to be recognized is small when passing through the insulating member 50 made of these materials, the energy of the reflected ultrasound waves received by the piezoelectric layer 30 is relatively high, and the signal strength of the electrical signal converted is strong, and the accuracy of pattern recognition is improved.

In an embodiment of the present disclosure, the transmitting electrode 60 may be made of a material with relatively good conductivity, such as copper, molybdenum, titanium, or the like.

In an embodiment of the present disclosure, the at least one transmitting electrode 60 is formed by using an electroplating process. The at least one transmitting electrode 60 is grown simultaneously in a direction parallel to the substrate and in a direction perpendicular to the substrate during the process of growth, and the resulted transmitting electrode 60 has a cross-section substantially in a shape of an inverted trapezoid in a direction perpendicular to the substrate. A size of a portion of the insulating member located between adjacent two of the transmitting electrodes satisfies the following relationship:

$$d > 2 * \frac{b}{a} x;$$

where d denotes a dimension of the portion of the insulating member located between the adjacent two of the transmitting electrodes in a direction parallel to the substrate;

$$\frac{b}{a}$$

denotes a ratio of a growth rate of the transmitting electrode in a direction parallel to the substrate to a growth rate in a direction perpendicular to the substrate; and
x denotes a dimension of the transmitting electrode in a direction perpendicular to the substrate.

As such, when the size of the transmitting electrode 60 in the direction perpendicular to the substrate is x, the growth size of the transmitting electrode 60 in the direction parallel to the substrate is (b/a)*x, due to the interval $$d > 2 * \frac{b}{a} x$$

of the adjacent transmitting electrodes on the seed member, contact of sides of the adjacent two transmitting electrodes 60 away from the piezoelectric layer 30 can be avoid, thereby avoiding signal crosstalk formed after the ultrasound waves reflected by the pattern pass through the transmitting electrodes 60.

In an exemplary embodiment of the present disclosure, the size of the transmitting electrode in the direction perpendicular to the substrate is 20 µm, the ratio of the growth rate of the transmitting electrode in the direction parallel to the substrate to the growth rate in the direction perpendicular to the substrate $$\frac{b}{a}$$

is equal to 3:4, and the interval d of adjacent two transmitting electrodes 60 on the seed member is >30 µm (2*(3:4)*20). When the transmitting electrode is grown to 20 µm in the direction perpendicular to the substrate, the adjacent two transmitting electrodes 60 do not contact, so that the ultrasound waves reflected by the pattern do not crosstalk.

Figure 12:
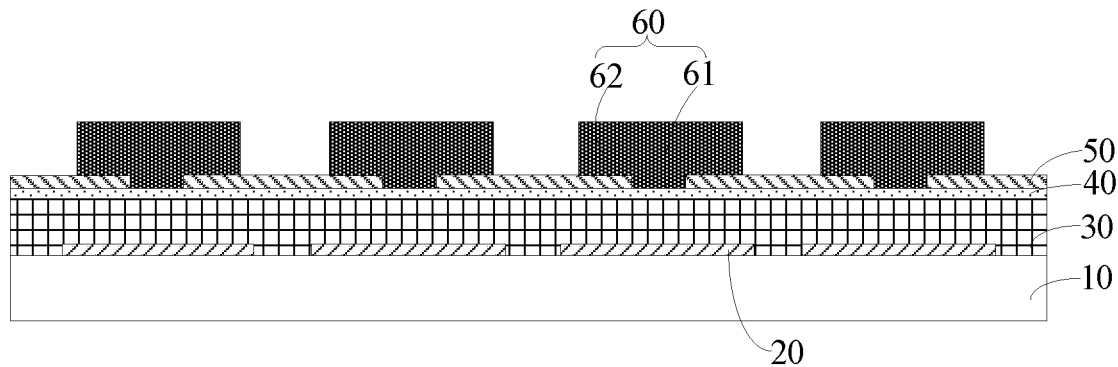
FIG. 12 is a partial schematic view of an ultrasonic pattern recognition assembly according to yet another exemplary embodiment of the present disclosure.

In some embodiments of the present disclosure, referring to FIG. 12, when the at least one transmitting electrode 60 is formed by an electroplating process, the resulted transmitting electrode 60 may also be substantially mushroom-like. The transmitting electrode 60 includes a first portion 61 located in the exposed portion and a second portion 62 which is disposed on the first portion 61 and on the insulating member 50. A surface of the second portion 62 near the piezoelectric layer 30 abuts the surface of the insulating member 50. As such, the insulating member 50 is arranged such that it can be avoided that air may be present between the second portion 62 and the piezoelectric layer 30, resulting in a great magnitude of attenuation as the ultrasonic wave passes.

In an embodiment of the present disclosure, referring to FIGS. 1 to 6, the seed member 40 includes a plurality of seed blocks 41 arranged at intervals, the insulating member 50 covers adjacent ones of the seed blocks 41 and is provided with at least one exposed portion 51 to expose at least a portion of a surface of the seed blocks 41, and at least one transmitting electrode 60 is formed on each of the seed blocks 41. Each of the seed blocks 41 is connected to a respective trace of the bonding region 70, which is connected to a respective control port of the chip, so that the chip can control the driving voltage applied to each of the seed blocks 41. When a voltage is applied to the seed block 41, an area of the piezoelectric layer 30 corresponding to the seed block 41 generates ultrasonic waves. The time at which the driving voltage is applied to each of the seed blocks 41 is different, so that the time at which the ultrasonic waves are generated in a region of the piezoelectric layer 30 corresponding to a respective seed block 41 is different. By controlling the time at which the driving voltage is applied to each of the seed blocks 41, that the ultrasound waves generated by different regions of the piezoelectric layer 30 are superimposed at a position of the pattern nay be achieved so that an energy of the ultrasound wave at the position is high, the energy of the ultrasound wave reflected by the pattern at the position is also high, and thus the signal strength of the electrical signal generated by the piezoelectric layer 30 is high, and the accuracy of the pattern recognition can be improved.

Figure 3:
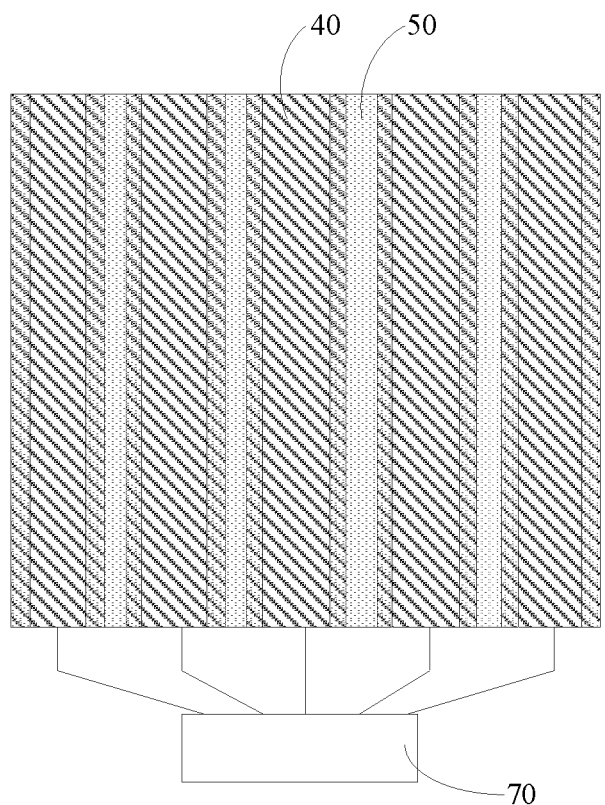
FIG. 3 is a partial schematic view of one embodiment of a seed member and an insulating member of the ultrasonic pattern recognition assembly shown in FIG. 1.
Figure 4:
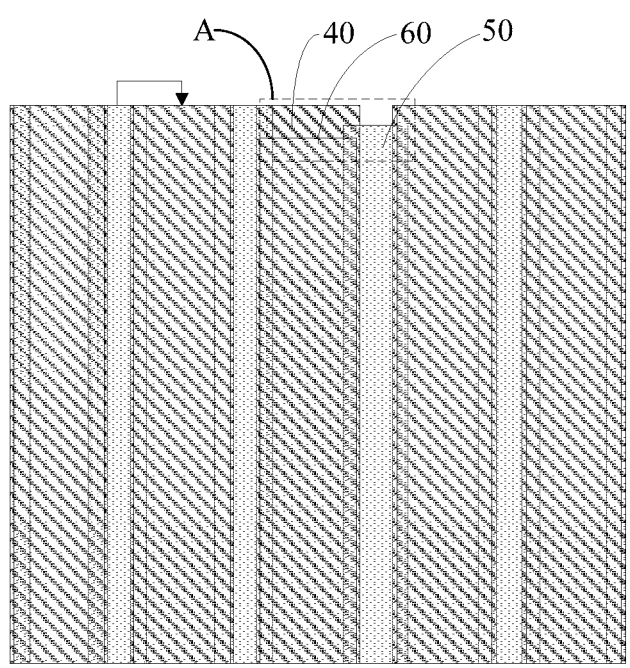
FIG. 4 is a partial schematic view of one embodiment of a seed member, an insulating member, and a transmitting electrode of the ultrasonic pattern recognition assembly shown in FIG. 1.

In the embodiment shown in FIGS. 3 and 4, the seed member includes a plurality of seed blocks 41, each having a strip shape and being spaced parallel to each other at intervals. The insulating member 50 includes a plurality of strip-shaped insulating portions, and a gap between adjacent two strip-shaped insulating portions forms an exposed portion of the insulating member 50, exposing a portion of the surface of each seed block 41. Each of the strip-shaped insulating members covers a gap between two adjacent seed blocks 41, and portions of the two seed blocks 41 adjacent to the gap. Each of the seed blocks 41 is provided with a respective transmitting electrode 60 thereon, which extends in the same direction as the corresponding seed block 41. For more clearly illustrating the structure of the seed block 41, the insulating member 50 and the transmitting electrode 60, a portion of the insulating member 50 and a portion of the transmitting electrode 60 in the region A of FIG. 4 is not shown, and in fact, the structure of the region A is the same as the structure of other regions.

Figure 5:
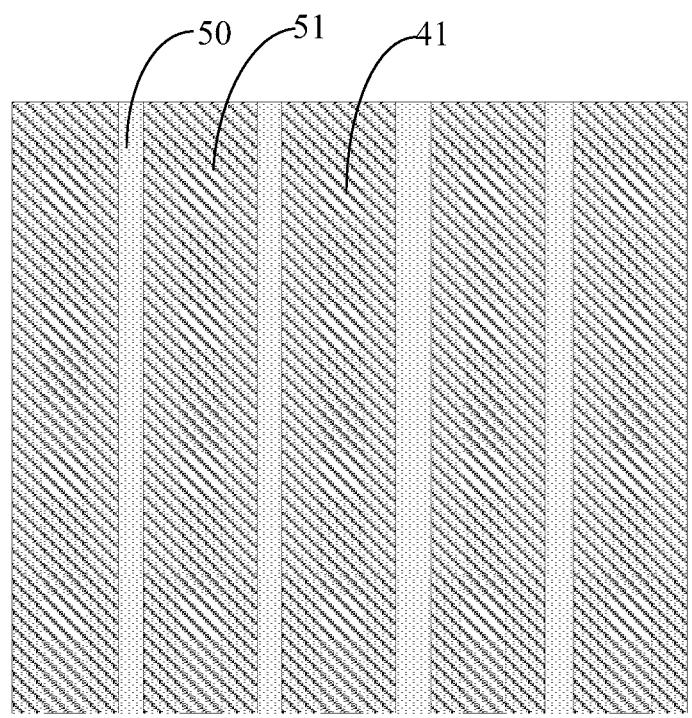
FIG. 5 is a partial schematic view of another embodiment of a seed member and an insulating member of the ultrasonic pattern recognition assembly shown in FIG. 1.
Figure 6:
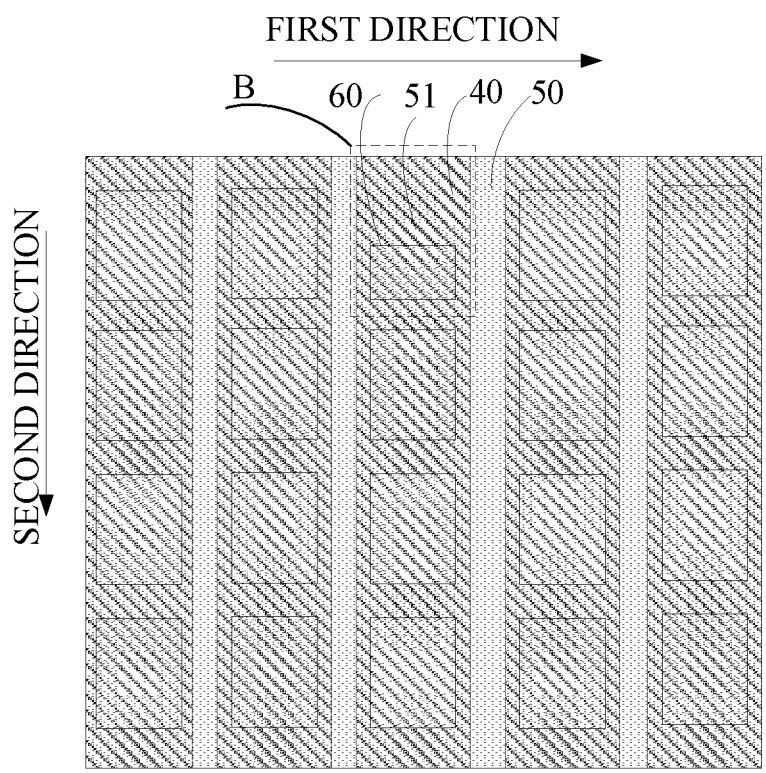
FIG. 6 is a partial schematic view of another embodiment of the seed member, the insulating member, and the transmitting electrode member of the ultrasonic pattern recognition assembly shown in FIG. 1.

In the embodiment shown in FIGS. 5 and 6, a plurality of strip-shaped seed blocks 41 are provided on the piezoelectric layer, and a plurality of transmitting electrodes 60 are provided on each of the seed blocks 41. The insulating member 50 covers the entire substrate and is provided with a plurality of vias arranged at intervals as a plurality of exposed portions 51, each exposing a portion of the surface of the seed block 41.

In an embodiment of the present disclosure, referring to FIGS. 5 and 6, a plurality of seed blocks 41 are arranged at intervals in parallel in a first direction, each of the plurality of seed blocks 41 having a plurality of transmitting electrodes 60 disposed thereon, and a plurality of transmitting electrodes 60 correspondingly arranged on each of the plurality of seed blocks 41 are arranged at intervals in a second direction, the first direction intersecting the second direction. In this way, when the ultrasound waves generated by the region of the piezoelectric layer 30 corresponding to the seed block 41 are reflected by the different locations of the pattern and then propagate toward the piezoelectric layer 30, the ultrasound waves reflected by the different locations propagate through the different transmitting electrodes 60 provided on the seed block 41. Since the adjacent two transmitting electrodes 60 are provided with an insulating material having an acoustic impedance different from the acoustic impedance of the transmitting electrodes 60, it is possible to prevent the reflected ultrasonic waves from transverse wave propagating to the adjacent transmitting electrodes as they pass through the transmitting electrodes 60, to avoid crosstalk of the ultrasonic waves reflected by the different locations of the pattern which affects the accuracy of pattern recognition. That is, by arranging the plurality of seed blocks 41 to be parallel in a first direction and the plurality of transmitting electrodes 60 arranged at intervals on each of the seeds blocks 41 in a second direction, the ultrasound waves generated by different regions of the piezoelectric layer 30 can be both superimposed in the first direction, and the ultrasound waves reflected by different locations of the pattern can be avoided from crosstalk upon propagating, and the accuracy of the pattern recognition can be further improved. To more clearly illustrate the structure of the seed members 40, the insulating members 50 and the transmitting electrodes 60, both a portion of the insulating member 50 and a portion of the transmitting electrode 60 are not shown in the region B of FIG. 6, and in fact, the structure of the region B is the same as the structure of the other regions.

In an embodiment of the present disclosure, the first direction and the second direction may be perpendicular to each other. The first direction may be a row direction and the second direction may be a column direction. Alternatively, the first direction may be a column direction and the second direction may be a row direction. In some embodiments of the present disclosure, the angle between the first direction and the second direction may not be equal to 90°.

In an embodiment of the present disclosure, a plurality of seed blocks 41 are disposed on the piezoelectric layer, and the plurality of seed blocks 41 are arranged in an array. On each of the plurality of seed blocks 41, one transmitting electrode may be provided, or a plurality of transmitting electrodes may be provided. In a case where a plurality of transmitting electrodes are provided, the plurality of transmitting electrodes are arranged in an array on the seed block.

In another embodiment of the present disclosure, referring to FIGS. 7 to 11, orthographic projection of the seed member 40 on the substrate 10 covers the entire area of the substrate 10, and the insulating member 50 includes a plurality of vias arranged at intervals as a plurality of exposed portions 51. The seed member 40 is connected to the chip by a trace of the bonding region 70. As such, when the driving voltage is applied to the seed member 40 and the receiving electrode 20, respective regions of the piezoelectric layer 30 generate ultrasonic waves at the same time, the generated ultrasonic waves are reflected after reaching different positions of the pattern to be identified, and the reflected ultrasonic waves are converted to electrical signals after reaching the piezoelectric layer 30, so that the chip can acquire the pattern information at different positions of the pattern to be identified, which can improve the efficiency of pattern recognition, and help to reduce power consumption.

Figure 10:
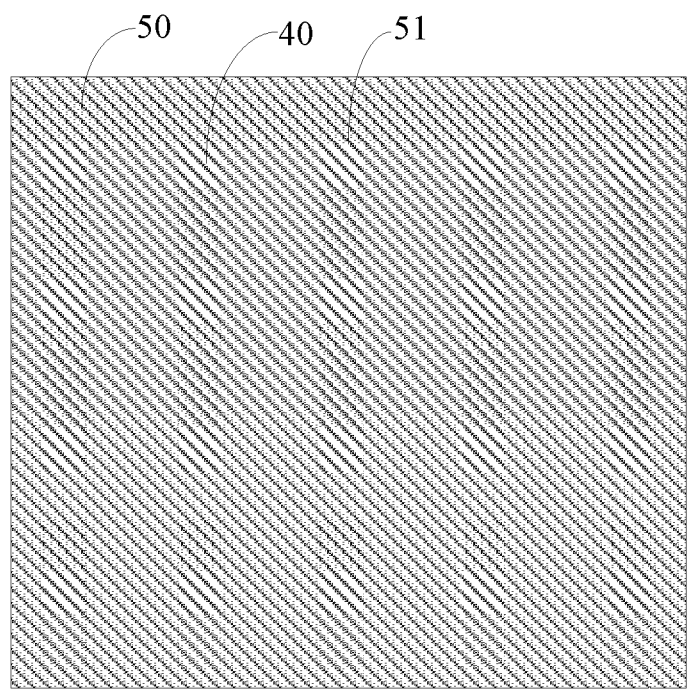
FIG. 10 is a partial schematic view of a seed member and an insulating member of the ultrasonic pattern recognition assembly shown in FIG. 7 or FIG. 8.
Figure 11:
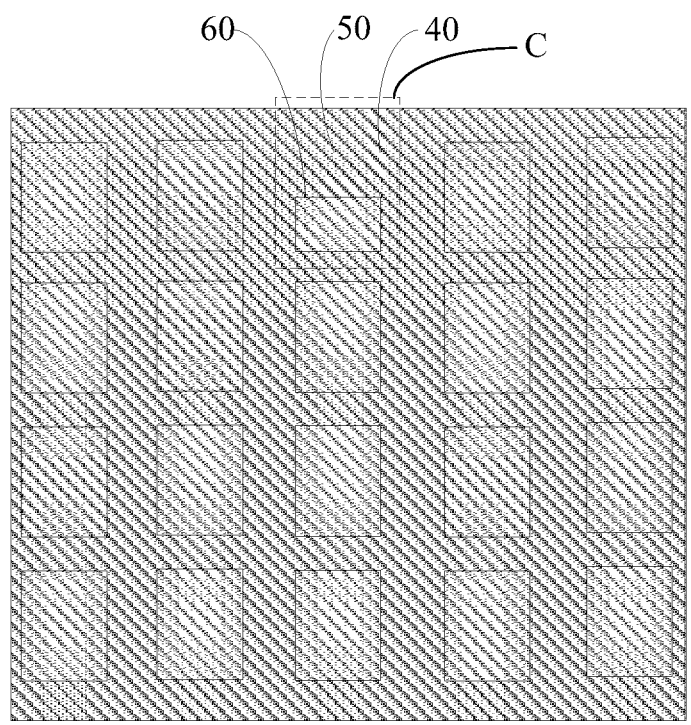
FIG. 11 is a partial schematic view of a seed member, an insulating member, and a transmitting electrode member of the ultrasonic pattern recognition assembly shown in FIG. 7 or FIG. 8.

As shown in FIGS. 10 and 11, the plurality of exposed portions 51 of the insulating member 50 are a plurality of vias arranged at intervals. To more clearly illustrate the structure of the seed member 40, the insulating member 50 and the transmitting electrode 60, both a portion of the insulating member 50 and a portion of the transmitting electrode 60 are not shown in the region C of FIG. 11, and in fact, the structure of the region C is the same as the structure of the other regions.

Figure 7:
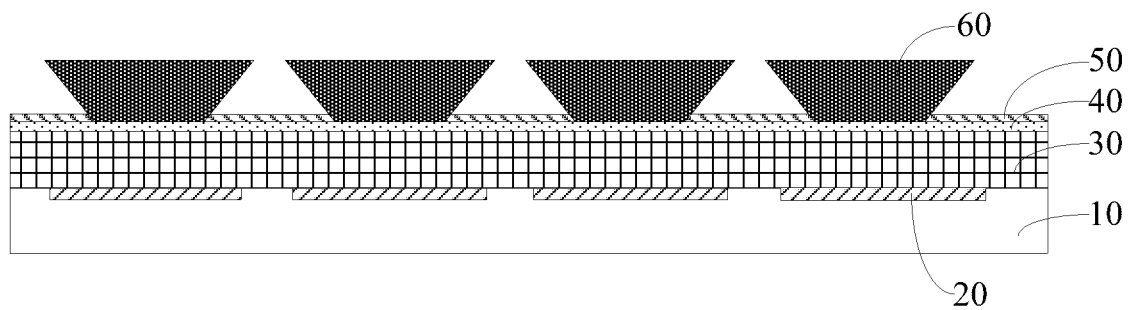
FIG. 7 is a partial schematic view of an ultrasonic pattern recognition assembly according to another exemplary embodiment of the present disclosure.
Figure 8:
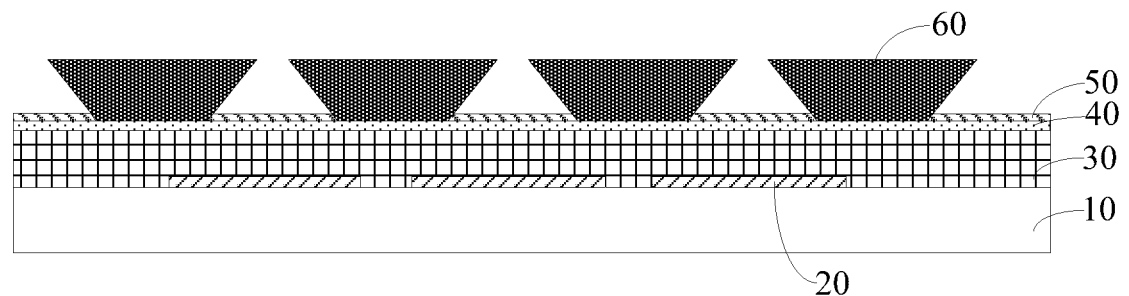
FIG. 8 is a partial schematic view of an ultrasonic pattern recognition assembly according to yet another exemplary embodiment of the present disclosure.
Figure 9:
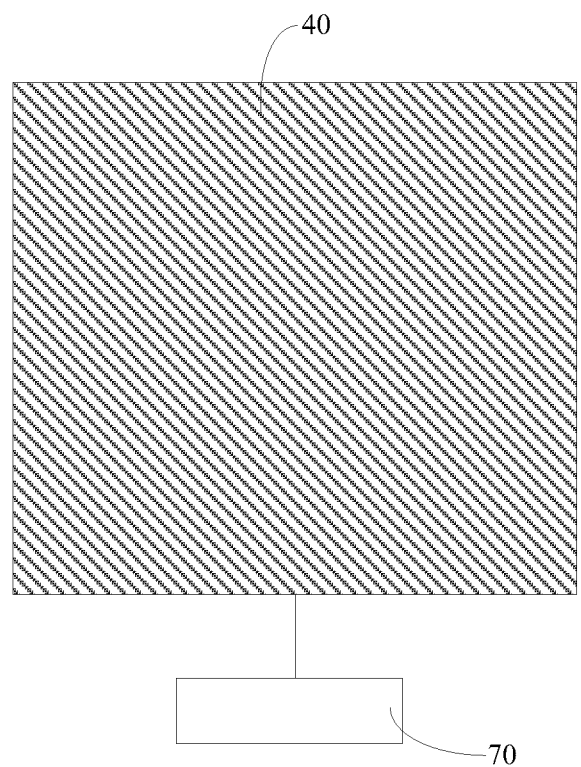
FIG. 9 is a partial schematic view of a seed member of the ultrasonic pattern recognition assembly shown in FIG. 7 or FIG. 8.

In an embodiment of the present disclosure, the plurality of transmitting electrodes 60 and the plurality of receiving electrodes 20 may have a one-to-one correspondence. In some embodiments of the present disclosure, as shown in FIG. 7, the transmitting electrode 60 is substantially aligned with the corresponding receiving electrode 20 in a direction perpendicular to the substrate, and an orthographic projection of the transmitting electrode 60 on the substrate 10 is substantially coincident with an orthographic projection of the receiving electrode 20 on the substrate 10. In some other embodiments of the present disclosure, as shown in FIG. 8, the transmitting electrode 60 is not aligned with the corresponding receiving electrode 20 in a direction perpendicular to the substrate, the orthographic projection of the transmitting electrode 60 on the substrate 10 is barely coincident with or less coincident with the orthographic projection of the receiving electrode 20 on the substrate 10, and the orthographic projection of the receiving electrode 20 on the substrate 10 is mostly coincident with the orthographic projection of the insulating member 50 on the substrate 10.

Figure 13:
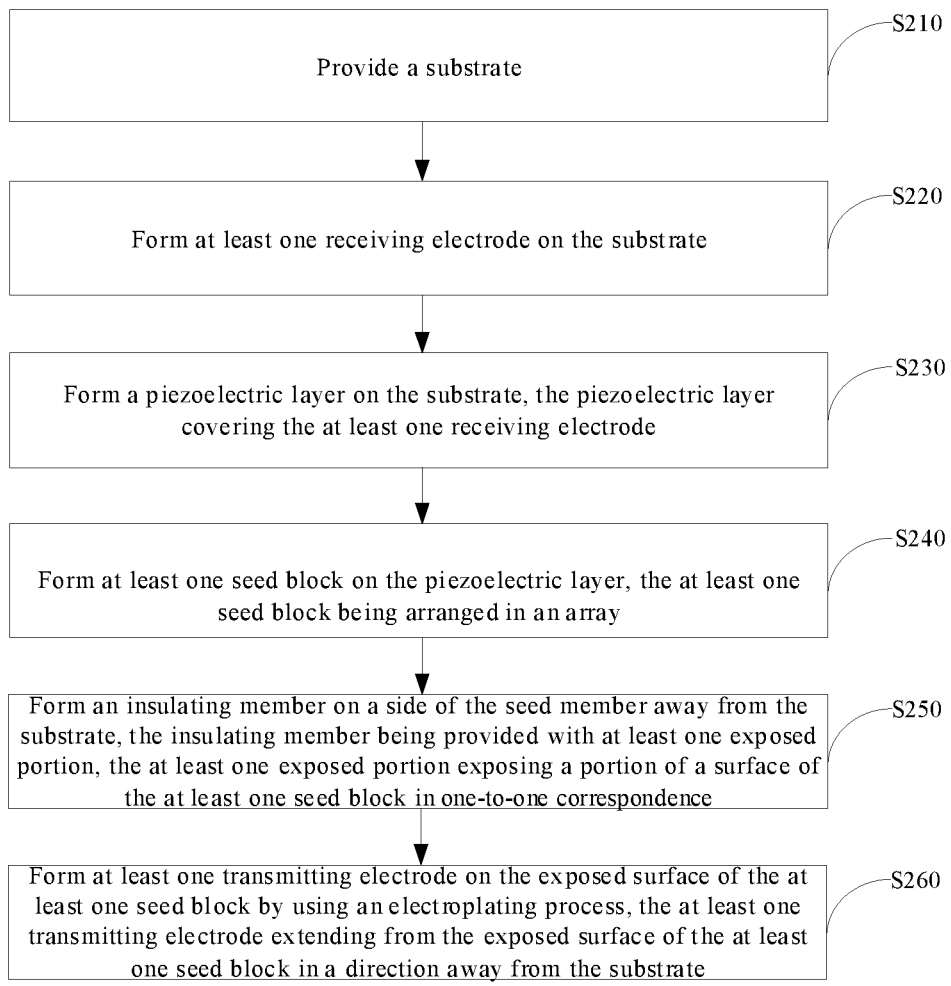
FIG. 13 is a flowchart of a method of manufacturing an ultrasonic pattern recognition assembly according to an exemplary embodiment of the present disclosure.

At least one embodiment of the present disclosure also provides a method of fabricating an ultrasonic pattern recognition assembly. Referring to FIG. 13, the fabricating method includes the following steps S210 to S260.

In step S210, a substrate is provided.

In an embodiment of the present disclosure, the substrate may be a flexible substrate or a rigid substrate. The material of the flexible substrate may be PET, PI or PC. The material of the rigid substrate may be glass, metal, or the like.

In step S220, at least one receiving electrode is formed on the substrate.

In an embodiment of the present disclosure, a conductive layer is formed on the substrate by a sputtering process, and then the conductive layer is patterned to form a plurality of receiving electrodes arranged at intervals. The plurality of receiving electrodes arranged at intervals form a receiving member.

The ultrasonic pattern recognition assembly may include a functional region and a bonding region. The receiving electrodes are disposed in the functional region, traces are disposed in the bonding region. Each of the receiving electrodes is connected to a different trace in the bonding region, and one end of the trace is connected to the chip, so that the chip can apply a voltage to the receiving electrode.

In step S230, a piezoelectric layer is formed on the substrate, the piezoelectric layer covering the at least one receiving electrode.

The piezoelectric layer is formed in the functional region. In some embodiments of the present disclosure, a projection of the piezoelectric layer on the substrate covers the entire area of the substrate. In some embodiments of the present disclosure, the projection of the piezoelectric layer on the substrate covers a portion of an area of the substrate.

In step S240, at least one seed block is formed on the piezoelectric layer, the at least one seed block being arranged in an array.

In some embodiments of the present disclosure, a conductive layer may be formed on a side of the piezoelectric layer away from the substrate by a sputtering process. In some embodiments of the present disclosure, the conductive layer is patterned after the conductive layer is formed to obtain at least one seed block. In some embodiments of the present disclosure, the at least one seed block is arranged in rows. In some embodiments of the present disclosure, the at least one seed block is arranged in columns. In some other embodiments of the present disclosure, the at least one seed block is arranged in an array. In some embodiments of the present disclosure, after the conductive layer is formed, the conductive layer may not be patterned, and the entire conductive layer may be used as a seed block.

When the seed member includes a plurality of seed blocks, each of the seed blocks is connected to the chip by a different trace in the bonding region, respectively. When the seed member includes one seed block, the seed member is connected to the chip through a trace of the bonding region.

In some embodiments of the present disclosure, a conductive layer may be formed on a side of the piezoelectric layer away from the substrate by a sputtering process, and then a patterning process is performed on the conductive layer to form a plurality of seed blocks in strips and parallel to each other.

In step S250, an insulating member is formed on a side of the seed member away from the substrate, the insulating member being provided with at least one exposed portion, the at least one exposed portion exposing a portion of a surface of the at least one seed block in one-to-one correspondence.

In an embodiment of the present disclosure, an insulating film layer is first formed on the seed member, and an orthographic projection of the insulating film layer on the substrate covers the entire area of the substrate. The insulating film layer is then patterned to form a plurality of exposed portions on the insulating film layer, thereby forming an insulating member.

In step S240, when the at least one seed block is arranged in rows or columns, after the insulating film layer is formed, the insulating film layer is patterned to form a plurality of parallel stripe-shaped insulating structures, and a gap is formed between two adjacent stripe-shaped insulating structures, thereby forming a bare portion. Each of the stripe-shaped insulating structures covers a gap between two adjacent seed blocks, and an edge portion of the seed block adjacent to the gap. As such, one transmitting electrode may be formed on each of the seed blocks in subsequent processes. In some embodiments of the present disclosure, in a case where a plurality of seed blocks in a strip shape and parallel to each other are formed, the plurality of exposed portions of the insulating member are a plurality of vias, and a plurality of vias are correspondingly provided on each of the seed blocks.

In another embodiment of the present disclosure, the seed member covers the entire substrate, and the plurality of exposed portions in the insulating member are a plurality of vias arranged at intervals.

In step S260, at least one transmitting electrode is formed on the exposed surface of the at least one seed block by using an electroplating process, the at least one transmitting electrode extending from the surface of the at least one seed block exposed by the exposed portion in a direction away from the substrate.

In an embodiment of the present disclosure, a number of the at least one transmitting electrode is the same as a number of the at least one receiving electrode, and there is a one-to-one correspondence between the at least one transmitting electrode and the at least one receiving electrode. Each of the at least one transmitting electrode is substantially aligned with a corresponding receiving electrode in a direction perpendicular to the substrate, and an orthographic projection of the transmitting electrode on the substrate is substantially coincident with an orthographic projection of the corresponding receiving electrode on the substrate. Alternatively, the transmitting electrode and the receiving electrode are not aligned in a direction perpendicular to the substrate, the orthographic projection of the transmitting electrode on the substrate is barely coincident or less coincident with the orthographic projection of the receiving electrode on the substrate, and the orthographic projection of the transmitting electrode on the substrate is mostly coincident with the orthographic projection of the insulating member on the substrate.

In an embodiment of the present disclosure, a size of a portion of the insulating member located between adjacent two of the transmitting electrodes satisfies the relationship:

$$d > 2 * \frac{b}{a} x;$$

where d denotes a dimension of the portion of the insulating member located between the adjacent two of the transmitting electrodes in a direction parallel to the substrate;

$\frac{b}{a}$ denotes a ratio of a growth rate of the transmitting electrode in a direction parallel to the substrate to a growth rate in a direction perpendicular to the substrate; and x denotes a dimension of the transmitting electrode in a direction perpendicular to the substrate.

For the method embodiments, since they substantially correspond to the product embodiments, a description of the relevant details and advantages will be made with reference to portions of the description of the product embodiments and will not be repeated herein.

In a method of fabricating an ultrasonic pattern recognition assembly according to an embodiment of the present disclosure, a plurality of exposed portions of the insulating member expose portions of a surface of the seed block, and the transmitting electrode extends from the exposed surface of the seed block in a direction away from the substrate, thus the total area of the seed member is larger than the total area of the contact area of the respective transmitting electrodes with the seed block. Since the transmitting electrode drives the piezoelectric layer through the seed block, the ultrasonic pattern recognition assembly according to an embodiment of the present disclosure can improve the accuracy of pattern recognition by avoiding a reduction in the driving ability of the transmitting electrode to the piezoelectric layer while ensuring that adjacent transmitting electrodes are not in contact.

Figure 14:
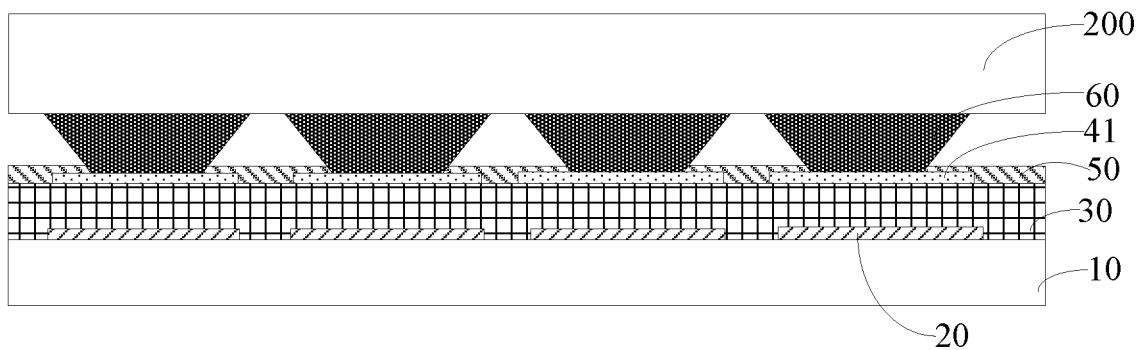
FIG. 14 is a schematic structural view of a display device according to an exemplary embodiment of the present disclosure.
Figure 15:
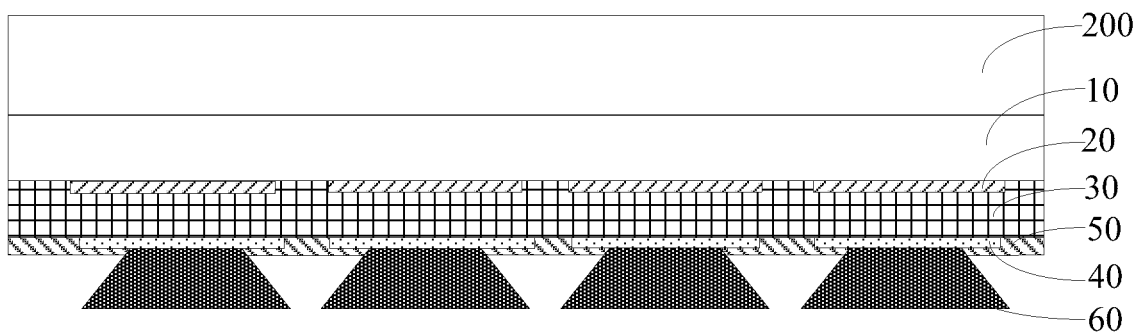
FIG. 15 is a schematic structural view of a display device provided according to another exemplary embodiment of the present disclosure.

At least one embodiment of the present disclosure also provides a display device. Referring to FIG. 14 or FIG. 15, the display device includes a display module 200 and any of the ultrasonic pattern recognition assemblies 100 described above.

In an embodiment of the present disclosure, the distance of the transmitting electrode to the display module 200 is less than the distance of the receiving electrode to the display module 200; alternatively, the distance of the transmitting electrode to the display module 200 is greater than the distance of the receiving electrode to the display module 200.

In the display device shown in FIG. 14, the distance from the transmitting electrode of the ultrasonic pattern recognition assembly 100 to the display module 200 is smaller than the distance from the receiving electrode to the display module 200, and the display module 200 is in direct contact with the transmitting electrode 60. During ultrasonic recognition of the ultrasonic pattern recognition assembly, the pattern to be identified is disposed on a side of the display module away from the ultrasonic pattern recognition assembly. The ultrasound waves reflected by the pattern propagate through the transmitting electrode 60 during transmission to the piezoelectric layer 30, and the transmitting electrode 60 can avoid crosstalk of the ultrasound waves and help to improve the accuracy of the pattern recognition.

In the display device shown in FIG. 15, the distance from the transmitting electrode of the ultrasonic pattern recognition assembly 100 to the display module 200 is greater than the distance from the receiving electrode to the display module 200, and the display module 200 is in direct contact with the substrate 10.

The display device according to the embodiments of the present disclosure may be, for example, a mobile phone, a tablet computer, a television, a laptop computer, or any device with a display function.

It is noted that in the drawings, the dimensions of layers and regions may be exaggerated for clarity of illustration. It will also be understood that when an element or layer is referred to as being "on" another element or layer, it can be directly on the other element or intervening layers may be present. In addition, it will be understood that when an element or layer is referred to as being "under" another element or layer, it can be directly under the other element or more than one intervening layer or element may be present. In addition, it will also be understood that when a layer or element is referred to as being "between" two layers or elements, it can be the only layer between the two layers or elements, or more than one intervening layer or element may also be present. Like reference numerals refer to like elements throughout.

Other embodiments of the present disclosure will be apparent to those skilled in the art from consideration of the specification and practice of the disclosure disclosed herein. This disclosure is intended to cover any variations, uses, or adaptations of the present disclosure which follow the general principles of the present disclosure, and which include common general knowledge or customary practice in the art to which the present disclosure is not disclosed. It is intended that the specification and embodiments can be considered as exemplary only, with a true scope and spirit of the present disclosure being indicated by the following claims.

It is to be understood that the present disclosure is not limited to the precise construction described above and illustrated in the drawings, and that various modifications and changes may be made without departing from the scope thereof. The scope of the present disclosure is limited only by the following claims.

The invention claimed is:

1. An ultrasonic pattern recognition assembly, comprising:
    a substrate;
    a receiving member comprising at least one receiving electrode disposed on the substrate;
    a piezoelectric layer disposed on the substrate and covering the receiving member;
    a seed member comprising at least one seed block disposed on at least a portion of the piezoelectric layer;
    an insulating member disposed on the seed member and having at least one exposed portion, the at least one exposed portion exposing a portion of a surface of the seed member; and
    a transmitting member comprising at least one transmitting electrode disposed on the seed member, the at least one transmitting electrode extending from a surface of the seed member exposed by the exposed portion in a direction away from the substrate,
    wherein a dimension of a portion of the insulating member located between adjacent two of the transmitting electrodes satisfies the relationship:

$$d > 2 * \frac{b}{a} x;$$

where d denotes a dimension of the portion of the insulating member located between the adjacent two of the transmitting electrodes in a direction parallel to the substrate;

$\frac{b}{a}$ denotes a ratio of a growth rate of the transmitting electrode in a direction parallel to the substrate to a growth rate in a direction perpendicular to the substrate; and x denotes a dimension of the transmitting electrode in a direction perpendicular to the substrate.

2. The ultrasonic pattern recognition assembly according to claim 1, wherein
the at least one seed block is arranged in an array,
for each of the at least one seed block, the at least one exposed portion is arranged in an array, the at least one exposed portion exposes portions of a surface of the seed block, and one of the at least one transmitting electrode is provided on each of the exposed portions of the surface of the seed block.

3. The ultrasonic pattern recognition assembly according to claim 1, wherein a thickness of the insulating member ranges from 0.1 μm to 1 μm.

4. The ultrasonic pattern recognition assembly according to claim 1, wherein a material of the insulating member comprises at least one of silicon oxide, silicon nitride, and resin.

5. The ultrasonic pattern recognition assembly according to claim 1, wherein the at least one transmitting electrode is formed by an electroplating process.

6. The ultrasonic pattern recognition assembly according to claim 1, wherein a material of the at least one seed block comprises at least one of molybdenum, copper, titanium, and aluminum.

7. The ultrasonic pattern recognition assembly according to claim 1, wherein a number of the at least one receiving electrode is equal to a number of the at least one transmitting electrode, and the at least one receiving electrode and the at least one transmitting electrode are substantially aligned in a direction perpendicular to the substrate.

8. The ultrasonic pattern recognition assembly according to claim 1, wherein the at least one receiving electrode and the at least one transmitting electrode are interleaved.

9. The ultrasonic pattern recognition assembly according to claim 1, wherein the substrate is a flexible substrate or a rigid substrate.

10. The ultrasonic pattern recognition assembly according to claim 1, wherein a material of the at least one transmitting electrode comprises at least one of copper, molybdenum, and titanium.

11. The ultrasonic pattern recognition assembly according to claim 1, wherein a dimension of the at least one transmitting electrode in a direction perpendicular to the substrate is 20 μm.

12. A display device comprising:
a display module; and
the ultrasonic pattern recognition assembly according to claim 1.

13. The display device according to claim 12, wherein
a distance of the at least one transmitting electrode to the display module is less than a distance of the at least one receiving electrode to the display module; or,
the distance of the at least one transmitting electrode to the display module is greater than the distance of the at least one receiving electrode to the display module.

14. A method of fabricating the ultrasonic pattern recognition assembly according to claim 1, comprising:
providing a substrate;
forming at least one receiving electrode on the substrate;
forming a piezoelectric layer on the substrate, the piezoelectric layer covering the at least one receiving electrode;
forming at least one seed block on the piezoelectric layer, the at least one seed block being arranged in an array;
forming an insulating member on a side of the at least one seed member away from the substrate, the insulating member being provided with at least one exposed portion, the at least one exposed portion exposing a portion of a surface of the at least one seed block; and
forming at least one transmitting electrode on the exposed surface of the at least one seed block by using an electroplating process, the at least one transmitting electrode extending from the exposed surface of the at least one seed block in a direction away from the substrate.

15. The method according to claim 14, wherein a thickness of the insulating member ranges from 0.1 μm to 1 μm.

16. The method according to claim 14, wherein a material of the insulating member comprises at least one of silicon oxide, silicon nitride, and a resin.

17. The method according to claim 14, wherein a material of the at least one seed block comprises at least one of molybdenum, copper, titanium, and aluminum.

18. The method according to claim 14, wherein a material of the at least one transmitting electrode comprises at least one of copper, molybdenum, and titanium.

* * * * *